(12) United States Patent
Spitzer

(10) Patent No.: US 7,761,577 B2
(45) Date of Patent: Jul. 20, 2010

(54) METHOD AND APPARATUS FOR DETECTING STUCK CALLS IN A COMMUNICATION SESSION

(75) Inventor: Andy Spitzer, North Andover, MA (US)

(73) Assignee: Dialogic Corporation, Montreal, Quebec (CA)

( * ) Notice: Subject to any disclaimer, the term of this patent is extended or adjusted under 35 U.S.C. 154(b) by 1059 days.

(21) Appl. No.: 11/047,167

(22) Filed: Jan. 28, 2005

(65) Prior Publication Data
US 2005/0207399 A1 Sep. 22, 2005

Related U.S. Application Data

(60) Provisional application No. 60/554,028, filed on Mar. 16, 2004.

(51) Int. Cl.
G06F 15/16 (2006.01)
(52) U.S. Cl. ...................................... 709/227
(58) Field of Classification Search .................. 709/227
See application file for complete search history.

(56) References Cited

U.S. PATENT DOCUMENTS

| | | | | |
|---|---|---|---|---|
| 5,442,637 | A * | 8/1995 | Nguyen | 714/708 |
| 5,465,392 | A * | 11/1995 | Baptist et al. | 370/310 |
| 5,495,480 | A * | 2/1996 | Yoshida | 370/389 |
| 5,566,225 | A * | 10/1996 | Haas | 455/423 |
| 6,212,175 | B1 * | 4/2001 | Harsch | 370/338 |
| 6,405,262 | B1 * | 6/2002 | Vogel et al. | 719/315 |
| 7,088,698 | B1 * | 8/2006 | Harsch | 370/338 |
| 2003/0187658 | A1 * | 10/2003 | Selin et al. | 704/270.1 |
| 2004/0236802 | A1 * | 11/2004 | Baratakke et al. | 707/204 |
| 2005/0008024 | A1 * | 1/2005 | Newpol et al. | 370/401 |
| 2005/0038801 | A1 * | 2/2005 | Colrain et al. | 707/100 |
| 2005/0050225 | A1 * | 3/2005 | Tatman | 709/244 |
| 2005/0117576 | A1 * | 6/2005 | McDysan et al. | 370/389 |
| 2005/0135248 | A1 * | 6/2005 | Ahuja et al. | 370/235 |
| 2005/0207340 | A1 * | 9/2005 | O'Neill | 370/230 |

(Continued)

OTHER PUBLICATIONS

Donovan et al., "RFC 4028—Session Timers in the Session Initiation Protocol (SIP)" Apr. 2005.*

(Continued)

*Primary Examiner*—J Bret Dennison
(74) *Attorney, Agent, or Firm*—Weingarten, Schurgin, Gagnebin & Lebovici LLP

(57) ABSTRACT

A method and apparatus for terminating a communication session at a first communication device that had established a communication session with a second communication device in response to a determination that the first communication device has not received any media packets from the second communication device within at least one predetermined time period. In the event the first device determines that no media packets have been received from the second device within a first predetermined time period, a probe is sent to the second device. If a positive response is not received by the first device within a second predetermined time period from the sending of the probe, the first device terminates the session. If a positive response is received by the first device in response to the probe, the first device transmits additional probes during the session whenever media packets are not received from the second device within a third predetermined time period and the session is terminated by the first device if a response to the respective probe is not received within the second predetermined time period.

15 Claims, 4 Drawing Sheets

U.S. PATENT DOCUMENTS

| | | | |
|---|---|---|---|
| 2006/0052083 A1* | 3/2006 | Choi et al. | 455/406 |
| 2007/0058599 A1* | 3/2007 | Harsch | 370/338 |
| 2007/0104105 A1* | 5/2007 | MeLampy et al. | 370/235 |
| 2007/0294345 A1* | 12/2007 | Bangalore et al. | 709/204 |
| 2008/0048986 A1* | 2/2008 | Khoo | 345/168 |
| 2008/0066168 A1* | 3/2008 | Gregg et al. | 726/7 |
| 2008/0086566 A1* | 4/2008 | Kumarasamy et al. | 709/227 |

OTHER PUBLICATIONS

RFC 3261—SIP: Session Initiation Protocol, pp. 1-285, Jun. 2002.

* cited by examiner

METHOD AND APPARATUS FOR DETECTING STUCK CALLS IN A COMMUNICATION SESSION

CROSS REFERENCE TO RELATED APPLICATIONS

This application claims priority of U.S. Provisional Patent Application No. 60/554,028 filed Mar. 16, 2004 entitled A METHOD FOR DETECTING STUCK CALLS IN A SESSION INITIATION PROTOCOL SESSION.

STATEMENT REGARDING FEDERALLY SPONSORED RESEARCH OR DEVELOPMENT

Not Applicable

BACKGROUND OF THE INVENTION

The present invention pertains to the transmission of voice, video or other information over the Internet in an interactive user session and, more specifically, to a method and apparatus for assuring that when one user agent ceases to participate in the session, the other user agent terminates its participation in the session.

The Session Initiation Protocol ("SIP") is a signaling protocol that is employed in the set up and termination of multimedia sessions and Internet telephony calls and is described with particularity in the Internet Engineering Task Force ("IETF") Request for Comments (RFC) 3261 dated June 2002, which is incorporated herein by reference.

The SIP is a peer-to-peer protocol in which each endpoint or User Agent (UA) typically includes a User Agent Client (UAC) and a User Agent Server (UAS). A UAC initiates the establishment of an interactive session between the UAC and a UAS by forwarding a SIP request in the form of a SIP INVITE message to the UAS directly or through a proxy agent (which includes a proxy server and a proxy client) as known in the art.

More specifically, to establish a typical SIP session directly between a UAC and a UAS, the UAC sends a SIP INVITE request directly to a UAS. Upon receipt of the INVITE request, the UAS forwards a RESPONSE message to the UAC. The UAC then forwards an acknowledgement (ACK) to the UAS and the participants then initiate the session using the Real-Time Transport Protocol (RTP) for transport of media packets through an IP network.

Alternatively, as is known, the session may be established through a proxy agent. To establish a session through a proxy agent, the UAC initiating the session sends an SIP INVITE request to the proxy server and the proxy client forwards the SIP INVITE request to the UAS. Upon receipt of the SIP INVITE request at the UAS, the UAS forwards a RESPONSE to the proxy client and the proxy server forwards the RESPONSE to the UAC. The UAC forwards an acknowledgement (ACK) to the proxy server and the proxy client forwards the ACK to the UAS. A session is then established between the. UAC as the calling device and the UAS as the called device.

In either circumstance, once the session is established, media packets are exchanged via the Real-time Transport Protocol and RTP/RTCP packets are exchanged between the participants in the session. At the end of a session the participants typically terminate the session in an orderly manner as specified in the SIP standard RFC 3261.

A Voice over Internet Protocol (VOIP) call created using the SIP can end up in a "stuck" state if one of the endpoints leaves the session or ceases to participate in the session for any reason without notifying the other endpoint via appropriate SIP signaling. This usually occurs as the result of a software bug, a system crash or due to some other anomaly within the network. When one endpoint ceases to participate in the session without notifying the other endpoint, the surviving endpoint continues to send media packets employing the Real-Time Transport Protocol (RTP) to the non-participant. This becomes a problem when the non-participant, be it a UAC or a UAS, attempts to make a new call and attempts to re-use the RTP destination port to which the surviving endpoint is still sending RTP/RTCP packets. If the surviving endpoint from the broken session and another user agent are both sending RTP streams to the same RTP destination port, problems are likely to arise with the newly initiated session.

An optional part of the SIP specified in RFC 3261 specifies that "session timers" may be employed by each participant in a session to address the above-described problem of "stuck" calls. When session timers are employed, after a session is initiated, the endpoints exchange session timer INVITE requests periodically in order to determine whether the other endpoint is still an active participant in the session. While this technique addresses the "stuck call" problem when both call participants properly support the use of session timers, many devices do not support session timers. Additionally, due to programming errors, the RTP data stream is sometimes interrupted during the transmission of a session timer INVITE message. The interruption of the RTP data stream while audio/video packets are being exchanged can glitch the audio/video being communicated in the session. This periodic glitching of the audio/video can be annoying to the end users. Consequently, session timers, even when supported, are often purposely disabled, leaving the system vulnerable to stuck calls.

Accordingly, it would be desirable to be able to solve the "stuck call" problem without periodically causing glitches in the media stream.

BRIEF SUMMARY OF THE INVENTION

In accordance with the present invention a method and apparatus are disclosed that assure that a party to a communication session will terminate the communication session upon determining that the other party to the session is no longer participating in the session. The presently disclosed technique is particularly applicable to a peer-to-peer session protocol, such as the Session Initiation Protocol (SIP), in which the signaling and media are conveyed in separate signaling and media transport planes.

More specifically, when employing SIP in conjunction with the improvement herein described, following the establishment of a SIP session, a determination is made as to whether the session timers that periodically send out a session timer INVITE message (probe) are disabled. If the session timers (e.g. as specified in RFC 3261) are disabled, then the presently described technique is employed.

In one embodiment, each participant includes a timer for timing the period from the last receipt of a Real-Time Transport Protocol (RTP) or Real-Time Transport Control Protocol (RTCP) packet. The timer is reset each time a RTP/RTCP packet is received. When a predetermined time period x has passed during which no RTP/RTCP packets have been received at a first participant in the session, the respective user agent (client or server) of the first participant that detected the absence of RTP/RTCP packets for the predetermined period x transmits a session timer INVITE message (probe) to the second participant in the session. As long as RTP packets are flowing, there is no need for the first participant to transmit another probe which may glitch the media stream.

While it is preferable for both participants to include a timer and implement the presently disclosed method, benefits are still obtained if only one of the participants in a session implements the presently disclosed technique.

If no response to the first probe is received by the first participant within a specified time period z, the first participant determines that the second participant is no longer participating in the session and clears the session.

If a positive response to the first probe is received by the first participant from the second participant in the session within the time period z, no further probes are transmitted by the first participant until the first participant detects that y seconds have passed without the receipt of a RTP/RTCP packet. Once y seconds have passed without the receipt of a RTP/RTCP packet, the first participant transmits a further probe to the second participant. If no response to this further probe is received within the specified period z, the session is cleared by the first participant. If a response is received to the further probe within z seconds, the timer is cleared and no other action is taken.

Thereafter, each time no RTP/RTCP packets are received by the first participant within the period y, probing is repeated by the first participant as described above and the session is cleared in the event a positive response to any such probe is not received within the specified period z.

In the foregoing manner, probes are only sent in the absence of RTP/RTPC traffic. Consequently, glitching of the audio/video media stream is typically avoided and a participant to a session will terminate the session if a RTP/RTPC packet is not received within the periods specified.

Other features, aspects and advantages of the presently disclosed system and method will be apparent to those of ordinary skill in the art from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the Drawings of which.

DETAILED DESCRIPTION OF THE INVENTION

U.S. Provisional Application No. 60/554,028 filed Mar. 16, 2004, entitled A METHOD FOR DETECTING STUCK CALLS IN A SESSION INITIATION PROTOCOL SESSION is incorporated herein by reference.

Figure 1A:
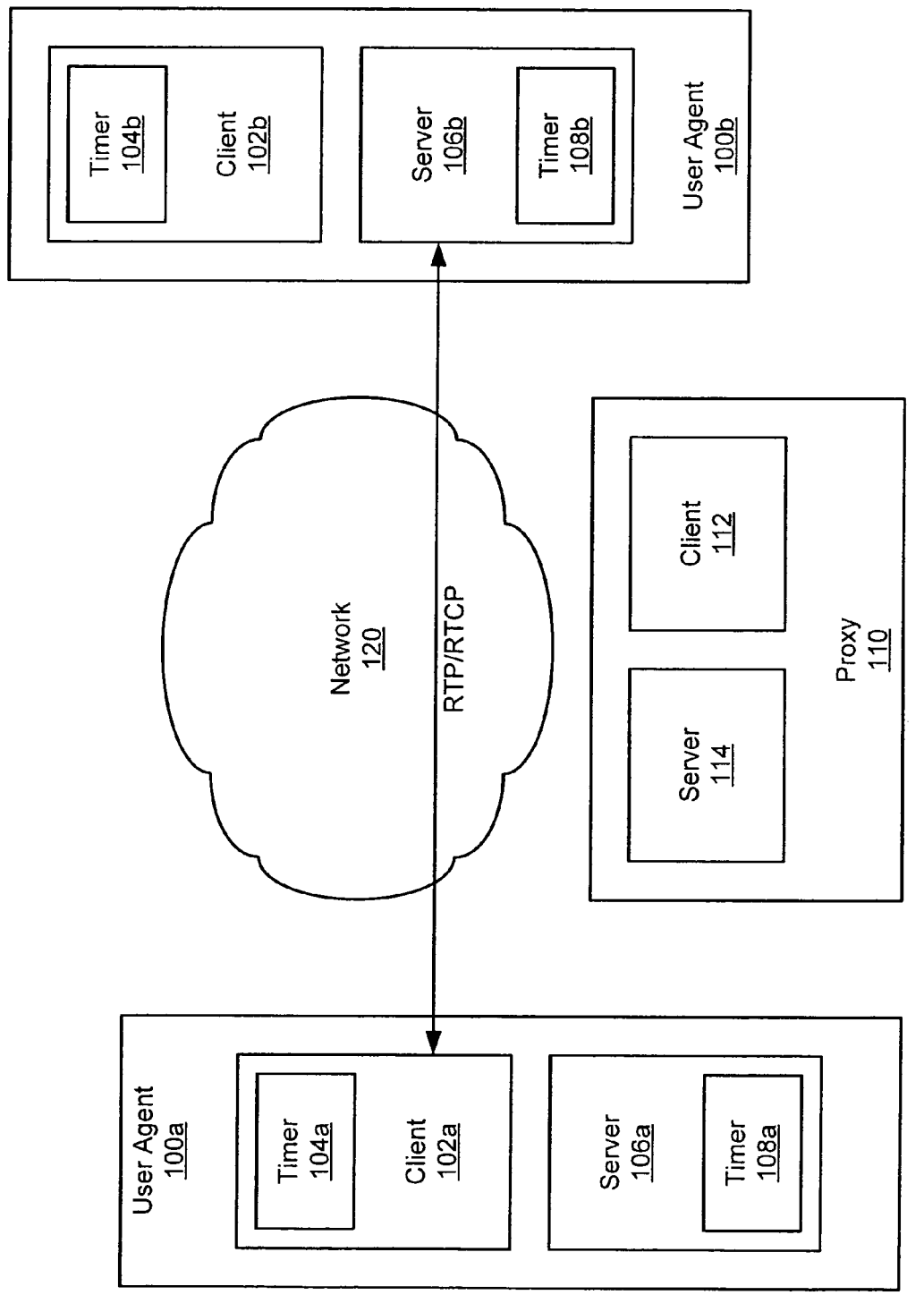
FIG. 1a is a block diagram illustrating an established peer-to-peer session in which session participants employ the presently disclosed technique for avoiding stuck calls.

FIGS. 1a-1c and FIG. 2 illustrate an exemplary system and method operative in accordance with the present invention. Referring to FIG. 1a, the system includes first and second user agents 100a and 100b communicating over a network 120, such as an IP network. User agent 100a includes a user agent client 102a and a server agent 106a. The client agent 102a includes a timer 104a that measures the time during which media packets have not been received by the client agent 102a. Similarly, the server agent 106a includes a timer 108a that measures the time during which media packets have not been received by the server agent 106a.

The second user agent 100b includes a client agent 102b having a timer 104b and a server agent 106b having a timer 108b. One of the client agents is operative to establish a communication session with a server agent of the other user agent via a signaling protocol, such as the Session Initiation Protocol (SIP) as known of the art. Once the session is established, media packets, such as audio/video packets are communicated between the respective client agent and the server agent over a communications network, such as IP network 120, via a transport protocol, such as the Real-Time Transport Protocol (RTP).

In the illustrated example, it is assumed that the first client agent 102a has initiated a session with the second server agent 106b via the SIP. FIG. 1a also depicts a proxy agent 110 having a proxy server 114 and a proxy client 112 which are discussed in greater detail below.

Each of the client and server agents described herein includes a processor executing a software program out of a memory such as a random access or read-only memory to perform the functions described herein. Alternatively, the functions of the client and server agents described herein may be embedded in whole or in part in hardware, software or firmware, or as combinations of hardware, software, or firmware to provide the functions described herein.

As discussed hereinabove, a session created using the SIP can end up in a "stuck" state when one of the endpoints leaves the session without the other endpoint being notified. In the present example, it will be assumed that the second server agent 106b ceases to participate in a session that was previously established without notifying the first client agent 102a. As previously noted, this circumstance can result from a software bug, a system crash or a failure within the network 120. In this circumstance the first client agent 102a continues to send RTP/RTCP packets via the network 120 to the second server agent 106b, however, the first client agent 102a no longer receives RTP/RTCP packets from the second server agent 106b. Consequently, if the second server agent 106b attempts to initiate a new session reusing the RTP destination port to which the first client agent 102a is still sending RTP packets, media streams from the session involving the first client agent 102a and another client that initiated the new session are both directed to the same RTP destination port. This situation can cause problems with the newly initiated session.

In accordance with the present invention, a method and system are disclosed that assure that a surviving participant in a session clears the session upon determining that the other session member is no longer active in the session. Accordingly, the problems associated with the transmission of multiple media streams from different agents to the same RTP destination port are avoided. The presently disclosed system and method also avoids the problem of glitching of the audio/video stream that can exist in the SIP as a result of the interruption of the RTP data stream during the periodic transmission of a session timer INVITE message.

The presently disclosed technique may be employed in conjunction with SIP after determining that the optional SIP session timers described in RFC 3261 are not being employed. Once a SIP session has been established and the participants have confirmed that the optional SIP session timers are not being employed, in the illustrative example, the client agent 102a and the server agent 106b each activate their associated timers 104a and 108b respectively. The timers 104a and 108b, unlike the optional SIP session timers, time the period in which no RTP/RTCP packets have been received. Thus, the timers 104a and 108b in the illustrative session are each reset upon the receipt of an RTP/RTCP packet.

When the timers 104a, 108b indicate that a period x has passed without the receipt of a RTP/RTCP packet, the associated client or server agent, as applicable, transmits a session timer INVITE message (probe) to the other session participant. Lack of RTP/RTCP packets alone does not equate to a "stuck" call condition since it is normal for agents in a session not to send packets for periods in excess of the timer period x. The absence of RTP/RTCP packets for the period x simply indicates that the other participant in the session has been idle and may no longer be participating.

When the timer reaches the period x indicating that no packets have been received for the specified interval, the client or server agent, as applicable, sends a probe to the other participant in the session to determine whether the session is still active at the far end. As long as RTP/RTCP packets are being received from the other participant, there is no need to send a probe to the other participant. Only once RTP/RTCP packets are not received for the specified interval x, are the presently described techniques employed.

Figure 1B:
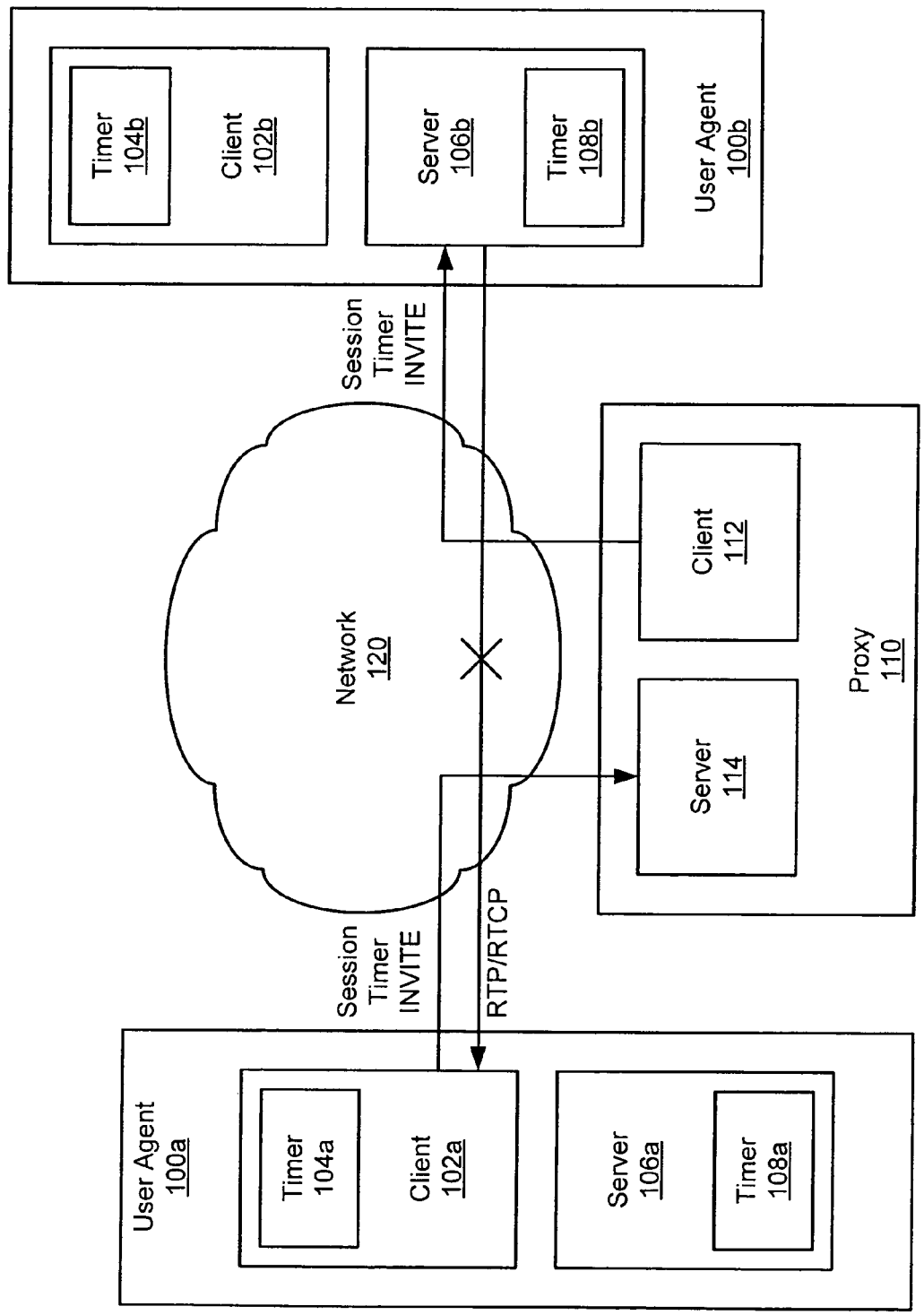
FIG. 1b is a block diagram of the system illustrated in FIG. 1a depicting the transmission of a session timer INVITE message (probe) in response to the detection of the absence of RTP and RTCP packet flow for a specified time period.
Figure 1C:
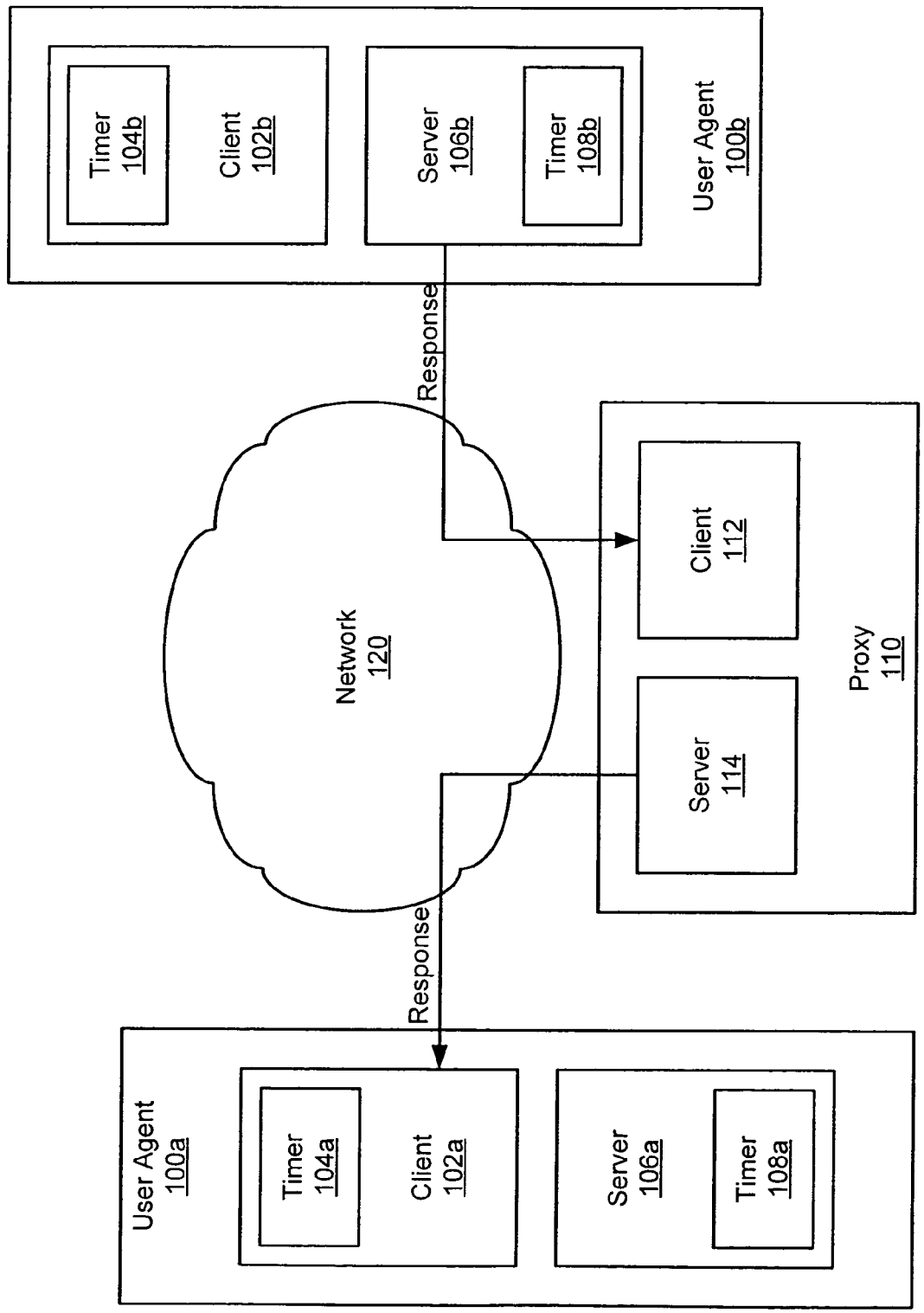
FIG. 1c is a block diagram of the system illustrated in FIG. 1b depicting the transmission of a response to the probe shown in FIG. 1b.

Thus, as depicted in FIG. 1b, once the timer 104a in client agent 102a indicates that no RTP/RTCP packets have been received for the period x, the client agent 102a forwards a probe to the server agent 106b to determine if the server agent 106b is still active in the session. If the session was established directly with the server agent 106b, the probe is sent directly to the server agent 106b. In the illustrated example, the session was established through the proxy 110. In this circumstance, the probe is sent to the proxy server agent 114 by the user client agent 102a and the probe is forwarded by the proxy client agent 112 to the user server agent 106b. If the user server agent 106b receives the probe and is still active in the session, it transmits a response back to the client agent 102a as specified in RFC 3261. If the session was established through a proxy agent 110 as depicted in FIG. 1c, the response is communicated from the user server agent 106b to the proxy client agent 112 and is forwarded from the proxy server agent 114 to the user client agent 102a. The response is forwarded directly from the server agent 106b to the client agent 102a if the session was established directly between the server agent 106b and the client agent 102a.

If the response is received by the client agent 102a within a predetermined time interval z from the sending of the probe, the client agent 102a resets the timer 104a and does not clear the session. In the event the response is not received within predetermined time interval z, such indicates that the server agent 106b is no longer active in the session. In this event, the client agent 102a clears the session and ceases to transmit RTP/RTCP packets to the server agent 106b. In this manner the above-described problem involving the receipt of multiple media streams from different sessions at the RTP destination port of the server agent 106b is avoided.

If a positive response is received from the user server agent 106b, the timer 104a is reset. The timer 104a continues to reset upon the receipt of each RTP/RTCP packet and a probe is sent each time the timer 104a indicates that no RTP/RTCP packets have been received for a period of y seconds. Since there are no RTP/RTCP packets typically flowing from the user server agent 106b when the probe is sent by the user client agent 102a, there is typically no audio/video to be glitched upon the transmission of the probe. In the event no response to a probe is received within the period z from the sending of the probe, the session is cleared. In the event a response to the probe is received within the period z, the respective timer is reset. The above described process is repeated whenever the timer 104a determines that the predetermined time period y has been reached until no response to a probe is received and the session is cleared or, the session is cleared by negotiation of the session participants.

In one embodiment, the timers in the respective user agents 100a, 100b are configured to trigger the sending of a probe when x equals approximately 120 seconds and when y equals approximately 300 seconds. It should be appreciated, however, that the specific values for x and y are a matter of design choice and may vary in different applications. Typically, the values of x and y may range from ten seconds to one hour. The value of z that specifies the timeframe for receipt of a response from the sending of a probe typically ranges from one second to one minute.

Figure 2:
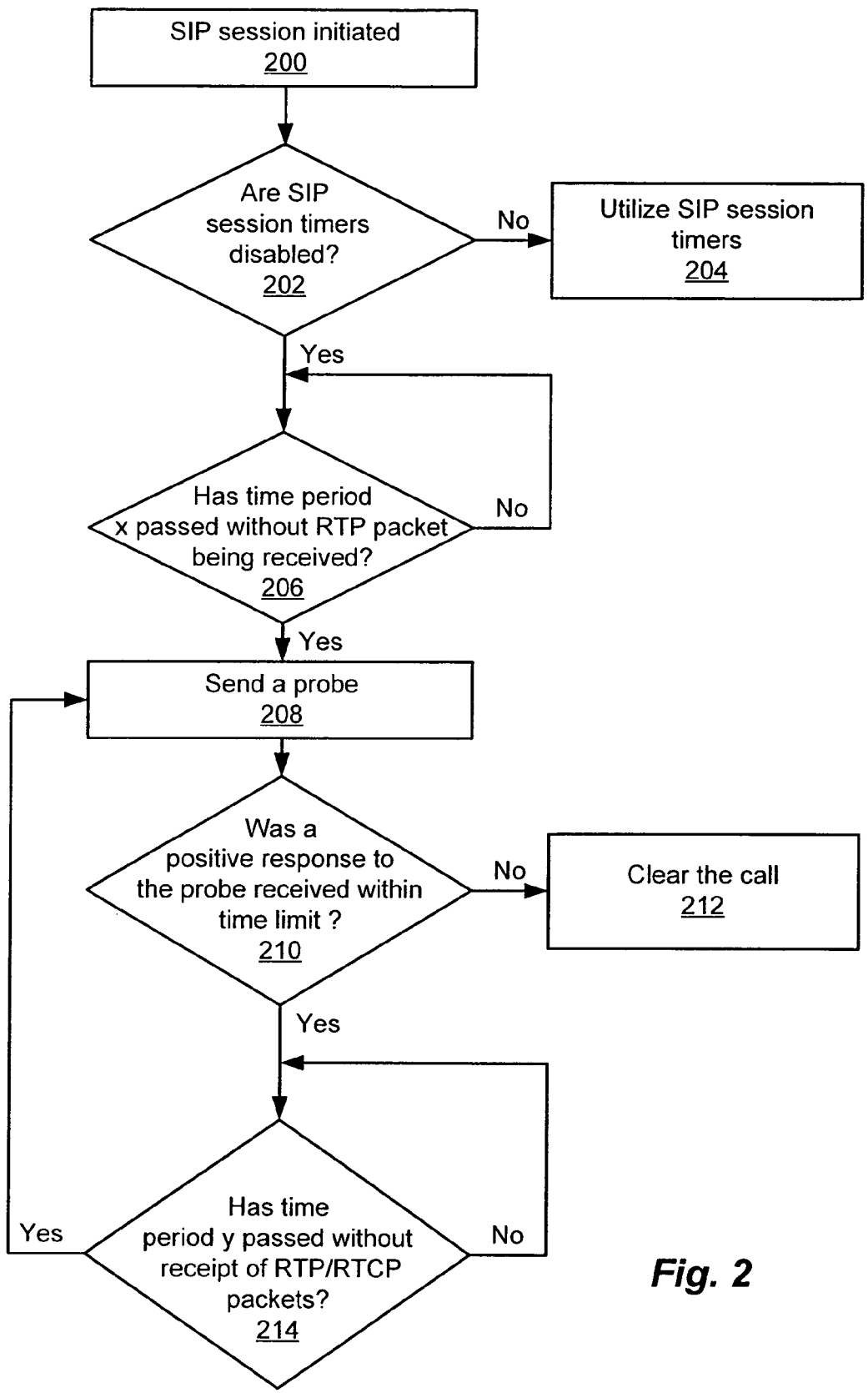
FIG. 2 is a flow diagram depicting an exemplary method operative in accordance with the present invention.

The presently disclosed method will be further understood by reference to FIG. 2. As depicted in FIG. 2, a communication session is established as shown at step 200. While the presently disclosed technique is illustrated in terms of the Session Initiation Protocol, it should be understood that the disclosed technique is applicable to other session protocols in which signaling and media are carried in separate planes. Similarly, while the present flow diagram describes the technique in terms of the use of the RTP, it should be understood that the disclosed technique may be employed for session communications employing other transport protocols.

As illustrated in step 202, a determination is made whether the SIP session timers are disabled. If the SIP session timers are not disabled, the SIP session timers are utilized as illustrated in step in 204. If it is determined that the SIP session timers are disabled, control passes to decision step 206. In decision step 206 a determination is made whether x seconds have passed since the receipt of an RTP/RTCP media packet at the respective client or server user agent. If x seconds have not passed without the receipt of any media packets, control returns to decision step 206. If it is determined that x seconds have passed without the receipt of any RTP/RTCP media packets, such triggers the sending of a probe and a probe is sent to the other session participant to determine if that participant is still active in the session as depicted in step 208. Following the sending of the probe, a determination is made whether a positive response to the probe was received within a predetermined time period z as depicted in step 210. If a positive response to the probe was not received at the agent that sent the probe within the time period z, the agent that sent the probe clears the call as illustrated in step 212 and ceases transmitting media packets to the other session participant.

If it is determined in step 210 that a positive response to the probe was received at the agent that sent the probe within the predetermined time period z, the agent that sent the probe resets its timer and continues to monitor the time period from the receipt of the last media packet.

As illustrated in decision step 214, in the event y seconds have passed without the receipt of any RTP/RTCP media packets at the respective agent, the sending of a probe is triggered, and the probe is sent to the other session participant as illustrated in step 208. Thereafter, processing proceeds in steps 210, 212, 214 and 208 as described above.

It should be recognized that a session may also be terminated in accordance with the normal signaling techniques for clearing calls independent of the presently disclosed technique.

Defaults for the values that determined the time periods x and y may be provided or alternatively, these values may be conveyed in the initial session request, such as the initial INVITE message in the SIP.

If the session protocol is one other than SIP that does not provide for session timers as in the SIP, step 202 is not necessary.

It should be recognized that the timers 104a, 108a, 104b and 108b may be embodied in software or alternatively as hardware devices.

While in the above-described example, the client agent 102a is described as the agent that clears the session, it should also be recognized that the same process may be employed at the server agent 106b to clear the session if the server agent 106b determines that the client agent 102a has ceased to participate in the session.

The above-described technique and apparatus may be employed with any suitable peer-to-peer session protocol in which signaling and data transport occur in separate signaling and media transport planes and is particularly beneficial in systems having untrustworthy networks. Additionally, while the illustrative example indicates the use of the presently disclosed technique for clearing stuck calls in the Session Initiation Protocol, the disclosed technique may be employed with the ITU Simple Endpoint Type Protocol (H.323) signaling, the Media Gateway Control Protocol (MGCP) or any other suitable session control protocol. Similarly, while the illustrated embodiment is described with respect to the RTP, it should be appreciated that any other suitable transport protocol for the applicable network may be employed.

While in above-described embodiment both session participants include timers and implement the presently disclosed method, the presently described technique may be employed by only one session member. The other session member may either not employ any technique for avoiding stuck calls or alternatively, employ conventional session timers as described in RFC 3261. For purposes of illustration it is assumed that the first user agent, such as client agent 102a includes a timer 104a and implements the presently disclosed method and the second user agent 106b, does not include the timer 108b and does not utilize either the presently disclosed technique for avoiding stuck calls or the session timers described in RFC 3261. If the second agent ceased to participate in the session and ceased transmitting RTP packets to the first agent, the first agent would detect the absence of RTP packets and terminate the session. Consequently, if the second agent established a new session using the same RTP destination port as was used with the first agent, the second agent would not be subject to the problems associated with the transmission of multiple RTP media streams to the single port.

If the first agent in the example described immediately above ceased transmitting RTP media packets to the second agent, the second agent would not detect the absence of RTP media packets and would not terminate the session. Consequently, the second agent would continue to transmit media packets to the first agent even if the first agent ceased participation in the session without notifying the second agent. In this circumstance, a problem could arise if the first agent initiated a new session utilizing the same RTP destination port as was used with the prior session involving the second agent. Thus, when one of the participants does not employ any technique for detecting stuck calls, the potential for the "stuck call" problem still exists at the other participant.

Finally, if a first participant in a session includes a timer and employs the presently disclosed technique and a second participant in the session employs conventional session timers, the session will be protected against stuck calls, however, the possibility exists that the media stream will be glitched each time the second participant transmits a session timer INVITE message as described above.

Thus, benefits are obtained employed the presently disclosed technique for avoiding stuck calls, whether the technique is used at one or both session participants.

It will be apparent to those of ordinary skill in the art that modifications to and variations of the above-described system and method may be made without departing from the inventive concepts disclosed herein. Accordingly, the invention should not be viewed as limited except by the scope and spirit of the appended claims.

What is claimed is:

1. A method of terminating a communication session between first and second communication devices over a communication network, the method comprising:
   receiving, at said first device, media packets transmitted by said second device including a last media packet transmitted by said second device;
   transmitting a first probe through said network from said first device to said second device when an amount of time since the receipt at said first device of the last media packet transmitted by said second device exceeds a first predetermined time period;
   if no response to said first probe is received at said first device from said second device within a second predetermined time period following the transmission of said first probe, terminating the communication session at said first device; and
   in the event a response to said first probe is received from said second device at said first device within said second predetermined time period following transmission of said first probe:
      transmitting a second probe from said first device to said second device when said amount of time since the receipt at said first device of the last media packet transmitted by said second device exceeds a third predetermined time period; and
      if no response to said second probe is received at said first device from said second device within said second predetermined time period following transmission of said second probe, terminating said communication session at said first device.

2. The method of claim 1 wherein said communication session comprises a Session Initiation Protocol (SIP) session and said first probe comprises a session timer INVITE message.

3. The method of claim 1 further comprising:
   receiving said media packets over a media transport plane and transmitting said first and second probes over a signaling plane distinct from said media transport plane.

4. The method of claim 3 further comprising ceasing transmission of media packets from said first device to said second device over said media transport plane upon termination of said session by said first device.

5. The method of claim 1, wherein said third predetermined time period is greater than said first predetermined time period.

6. The method of claim 5 wherein each of said third predetermined time period and said first predetermined time period is in a range from ten seconds to one hour.

7. The method of claim 1 wherein transmitting said first and second probes comprises transmitting said first and second probes directly from said first device to said second device.

8. The method of claim 1 wherein transmitting said first and second probes from said first device to said second device comprises transmitting said first and second probes from said first device to a proxy agent and transmitting said first and second probes from said proxy agent to said second device.

9. Apparatus at a first communication device for terminating a communication session between said first communication device and a second communication device, said apparatus comprising:
  a processor;
  at least one storage device containing a software program;
  at least one timer;
  said processor operable to execute said software program and cooperative with said at least one timer to:
    measure, at said first device, an amount of time since a receipt of a last media packet transmitted by said second device and determine when said amount of time since the receipt of said last media packet exceeds a first predetermined time period;
    transmit a first probe through a network from said first device to said second device in the event said amount of time since the receipt of said last media packet exceeds said first predetermined time period;
    terminate said communication session at said first device if no response to the first probe is received at said first device from said second device within a second predetermined time period following the transmission of said first probe; and
    if a response to said first probe is received at said first device within said second predetermined time period after said transmission of said first probe:
      transmit a second probe from said first device to said second device when it is determined that said amount of time since the receipt of said last media packet exceeds a third predetermined time period; and
      terminate said communication session at said first device if no response to said second probe is received at said first device from said second device within said second predetermined time period following transmission of said second probe.

10. The apparatus of claim 9 wherein said at least one timer is embodied in a software process.

11. The apparatus of claim 9 wherein said at least one timer comprises at least one hardware timer.

12. The apparatus of claim 9 wherein said first communication device is operative to receive said media packets over a data transport plane and to transmit said first and second probes and to receive responses to said first and second probes over a signaling plane distinct from said data transport plane.

13. A method of controlling a peer-to-peer communication session between first and second communication devices over a communications network, the method comprising:
  in each of said first and second communication devices:
    measuring an amount of time since a last media packet was received from the other of said first and second communication devices;
    transmitting a first probe to the other of said first and second communication devices if said measured amount of time since the receipt of said last media packet exceeds a first predetermined time period;
    terminating said communication session if an amount of time since sending said first probe exceeds a second predetermined time period and a response to said first probe has not been received from the other of said first and second communication devices, and
    if a response to said first probe is received within said second predetermined time period since sending said first probe and said amount of time since the receipt of said last media packet exceeds a third predetermined time period:
      transmitting a second probe to the other of said first and second communication devices; and
      terminating said communication session if a response to said second probe has not been received from the other of said first and second communication devices within said second predetermined time period since sending the second probe.

14. The method of claim 13, further comprising transmitting said first and second probes from one of said first and second communication devices to a proxy agent and transmitting said first and second probes from said proxy agent to the other of said first and second communication devices.

15. The method of claim 13, further comprising:
  receiving said media packets over a media transport plane and transmitting said first and second probes over a signaling plane distinct from said media transport plane.

* * * * *